US008107432B2

(12) United States Patent
Seo

(10) Patent No.: US 8,107,432 B2
(45) Date of Patent: Jan. 31, 2012

(54) DUAL-MODE MOBILE TERMINAL AND METHOD FOR HANDOVER OF PACKET SERVICE CALL BETWEEN DIFFERENT COMMUNICATION NETWORKS

(75) Inventor: Jong-Won Seo, Seoul (KR)

(73) Assignee: Samsung Electronics Co., Ltd (KR)

( * ) Notice: Subject to any disclaimer, the term of this patent is extended or adjusted under 35 U.S.C. 154(b) by 1351 days.

(21) Appl. No.: 11/343,302

(22) Filed: Jan. 31, 2006

(65) Prior Publication Data
US 2007/0014260 A1    Jan. 18, 2007

(30) Foreign Application Priority Data

Jul. 15, 2005  (KR) .................. 10-2005-0064497

(51) Int. Cl.
*H04W 4/00* (2009.01)
(52) U.S. Cl. ........ 370/331; 370/332; 370/338; 370/318; 455/436; 455/552.1
(58) Field of Classification Search .................. 370/310, 370/328, 329, 331, 332, 335, 338, 318, 352, 370/353, 333; 455/436, 414.1, 437, 438, 455/450, 452.2, 550.1, 552.1, 574
See application file for complete search history.

(56) References Cited

U.S. PATENT DOCUMENTS

| 7,020,472 | B2 * | 3/2006 | Schmidt | 455/450 |
| 2002/0004528 | A1 | 1/2002 | Magnus et al. | |
| 2002/0111169 | A1 | 8/2002 | Vanghi | |
| 2003/0139184 | A1 * | 7/2003 | Singh et al. | 455/436 |
| 2003/0152049 | A1 * | 8/2003 | Turner | 370/331 |
| 2003/0224791 | A1 * | 12/2003 | Choi et al. | 455/436 |
| 2004/0114553 | A1 * | 6/2004 | Jiang et al. | 370/328 |
| 2004/0180660 | A1 * | 9/2004 | Choi et al. | 455/436 |
| 2004/0203873 | A1 * | 10/2004 | Gray | 455/456.1 |
| 2005/0128980 | A1 * | 6/2005 | Han et al. | 370/331 |
| 2006/0171376 | A1 * | 8/2006 | Schwarz | 370/352 |
| 2007/0047504 | A1 * | 3/2007 | Akram et al. | 370/338 |
| 2007/0259667 | A1 * | 11/2007 | Kim et al. | 455/440 |
| 2008/0096565 | A1 * | 4/2008 | Jin et al. | 455/437 |
| 2008/0101291 | A1 * | 5/2008 | Jiang et al. | 370/331 |

FOREIGN PATENT DOCUMENTS

WO    WO 2004/002051    12/2003

* cited by examiner

*Primary Examiner* — Jean A Gelin
(74) *Attorney, Agent, or Firm* — The Farrell Law Firm, P.C.

(57) ABSTRACT

A dual-mode mobile terminal and method for performing PS call between different communication networks. In the mobile terminal, a second communication module which communicates with a second communication network, prepares for its operation and enters into a low power mode when it is requested for the PS call through a first communication module communicating with a first communication network. When the mobile terminal moves from the first communication network to the second communication network, the second communication module performs an initialization for the PS call to the second communication network. When the initialization is complete, the second communication module interrupts the PS call through the first communication network and performs a packet service communication through the first communication network.

12 Claims, 4 Drawing Sheets

DUAL-MODE MOBILE TERMINAL AND METHOD FOR HANDOVER OF PACKET SERVICE CALL BETWEEN DIFFERENT COMMUNICATION NETWORKS

PRIORITY

This application claims priority to an application entitled "Method for Handover of Packet Service Call between Different Communication Networks and Dual-Mode Mobile Terminal for the same" filed in the Korean Industrial Property Office on Jul. 15, 2005 and assigned Serial No. 2005-64497, the contents of which are hereby incorporated by reference.

BACKGROUND OF THE INVENTION

1. Field of the Invention

The present invention relates generally to a dual-mode mobile terminal and a method for handover between communication networks using different mobile communication technologies to provide communication services.

2. Description of the Related Art

Currently, Code Division Multiple Access (CDMA) systems are distributed in a wide variety of service areas and equipped with complete infrastructures. However, a third generation communication network, such as a Wideband Code Division Multiple Access (WCDMA) system, has been gradually introduced in order to provide communication services that a second generation communication network, such as CDMA system, cannot provide. Meanwhile, dual-mode mobile terminals have been developed that are capable of providing specific services in a third generation network area while using infrastructure of the second generation network.

Recently, a requirement for mobile terminals capable of operating in all the WCDMA and CDMA systems has driven the development of a dual-mode mobile terminal supporting both of the WCDMA and CDMA systems. The dual-mode mobile terminal requires various technologies optimally compatible with the two modes. Among those technologies, there is roaming for a handover between the WCDMA and CDMA modes in the mobile terminal.

The handover function of the dual-mode mobile terminal enables the mobile terminal to convert the two modes of WCDMA and CDMA into each other. That is, while operating in the WCDMA mode in an area in which the WCDMA service is available, the mobile terminal converts the WCDMA mode into the CDMA mode when a user gets out of the WCDMA service area.

FIG. 1 is a schematic view illustrating an area in which conventional CDMA and WCDMA communication networks are set. Referring to FIG. 1, the area having the CDMA and WCDMA communication networks is divided into a dedicated CDMA service area and an overlapping service area in which all CDMA and WCDMA services are supportable.

When a user enters the CDMA service area 150 during an operation of the dual-mode mobile terminal 100 in the WCDMA mode in the overlapping service area 160, the mobile terminal fails to find a WCDMA base station and scans for a CDMA base station. When the mobile terminal finds the CDMA base station, the mobile terminal converts the WCDMA mode into the CDMA mode and completes a handover. However, when the user moves from the CDMA service area to the overlapping service area 160, the mobile terminal 100 performs the handover in order to convert the CDMA mode into the WCDMA mode according to certain conditions.

Nevertheless, when the user moves from one communication network to another while the dual-mode mobile terminal 100 communicates with the one communication network for a packet service, the mobile terminal does not perform a handover of a Packet Service call (PS call). That is, when the user moves from one communication network to another while communicating with one of the communication networks to obtain packet service, the dual-mode mobile terminal 100 interrupts the communication with the previous communication network to obtain the packet service and performs an initialization for a PS call in order to communicate with another communication network for a packet service.

As described above, in order to perform the handover from one communication network to another during the packet service communication of the mobile terminal, the mobile terminal interrupts its_connection to the previous communication network and communicates with a new communication network for the packet service communication. Consequently, there is a problem in that when a user moves in different communication networks during the operation of the mobile terminal for the packet service communication, the mobile terminal cannot continuously receive packet service data.

SUMMARY OF THE INVENTION

Accordingly, the present invention has been designed to solve the above and other problems occurring in the prior art.

An object of the present invention is to provide a dual-mode mobile terminal and a handover method, which can guarantee continuity of packet service in handover between communication networks using different mobile communication technologies to provide communication services.

In order to accomplish the above and other objects, according to an aspect of the present invention, there is provided a dual-mode mobile terminal for performing a handover for a PS call between first and second communication networks. The mobile terminal includes: a first communication module for receiving packet service data through the first communication network, the first communication module being connected to and capable of communicating with the first communication network; and a second communication module for communicating with the second communication network and, being in a disabled state. The first communication module enables the second communication module to prepare for an operation and enter into a low power mode when it is requested for the PS call, and controls the second communication module to initialize for a packet service communication when receiving a handover message from the first communication network when an event for the handover occurs.

According to another aspect of the present invention, there is provided a method of performing a handover of a PS call between first and second communication networks using a dual-mode mobile terminal including a first communication module for communicating with a first communication network and a second communication module for communicating with a second communication network. The method includes the steps of: receiving, in the first communication module, packet service data through the first communication network;

controlling the second communication module to prepare for an operation and enter into a low power mode; and controlling, by the first communication module, the second communication module to initialize for a packet service communication, when the first communication module receives a handover message from the first communication network as an event for the handover occurs.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE PREFERRED EMBODIMENT

Figure 1:
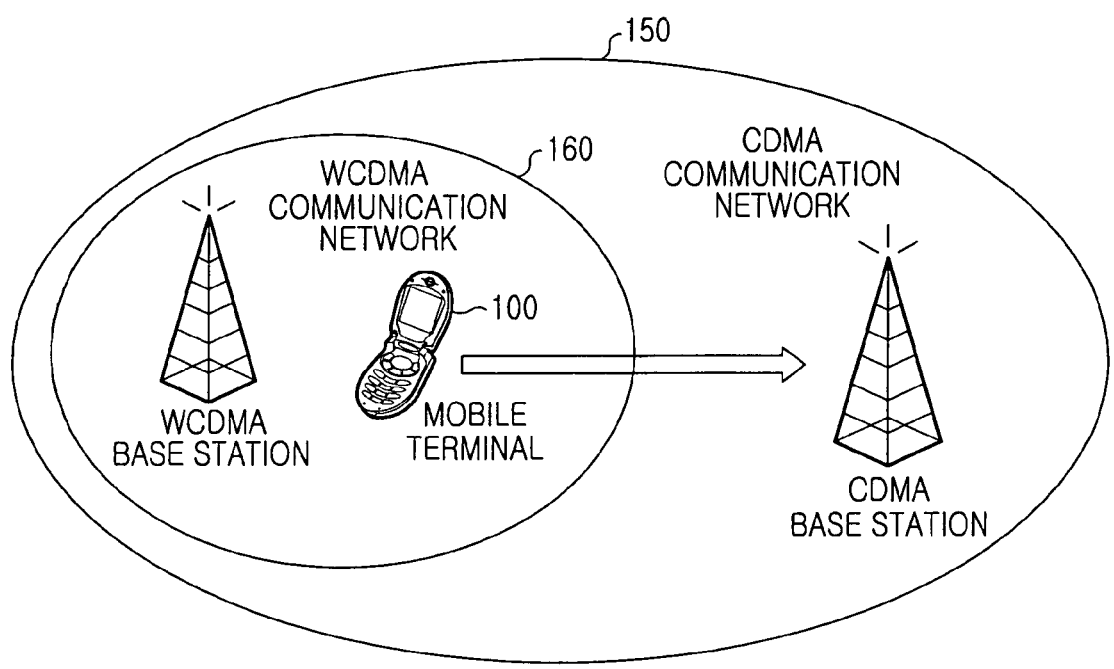
FIG. 1 is a view illustrating an area in which conventional CDMA and WCDMA networks are set.

Hereinafter, preferred embodiments of the present invention will be described in detail with reference to the accompanying drawings. Like reference numeral denotes the same element throughout drawings and the description. Additionally, in the following description of the present invention, a detailed description of known functions and configurations incorporated herein will be omitted to avoid making the subject matter of the present invention unclear.

The present invention provides a dual-mode mobile terminal and a method of efficiently performing handover of PS calls between communication networks that provide communication services using different mobile communication technologies. More specifically, when receiving a PS call through a first module capable of communicating with a first communication network, the dual-mode mobile terminal, according to a preferred embodiment of the present invention, enables a second module thereof, which can communicate with a second network, to operate and enter into a low power mode. Thereafter, when the dual-mode mobile terminal moves from the first communication network to the second communication network, the dual-mode mobile terminal commands the second module to perform initialization for a PS call with the second network. When the second module completes the initialization for the PS call with the second communication network, the dual-mode mobile terminal interrupts the PS call through the first communication network and communicates through the second communication network.

Therefore, when a user moves to one communication network during a packet service communication with another communication network using the dual-mode mobile terminal according to the present invention, the dual-mode mobile terminal can minimize a handover duration of the PS call, in order to guarantee a continuity of the PS call.

Figure 2:
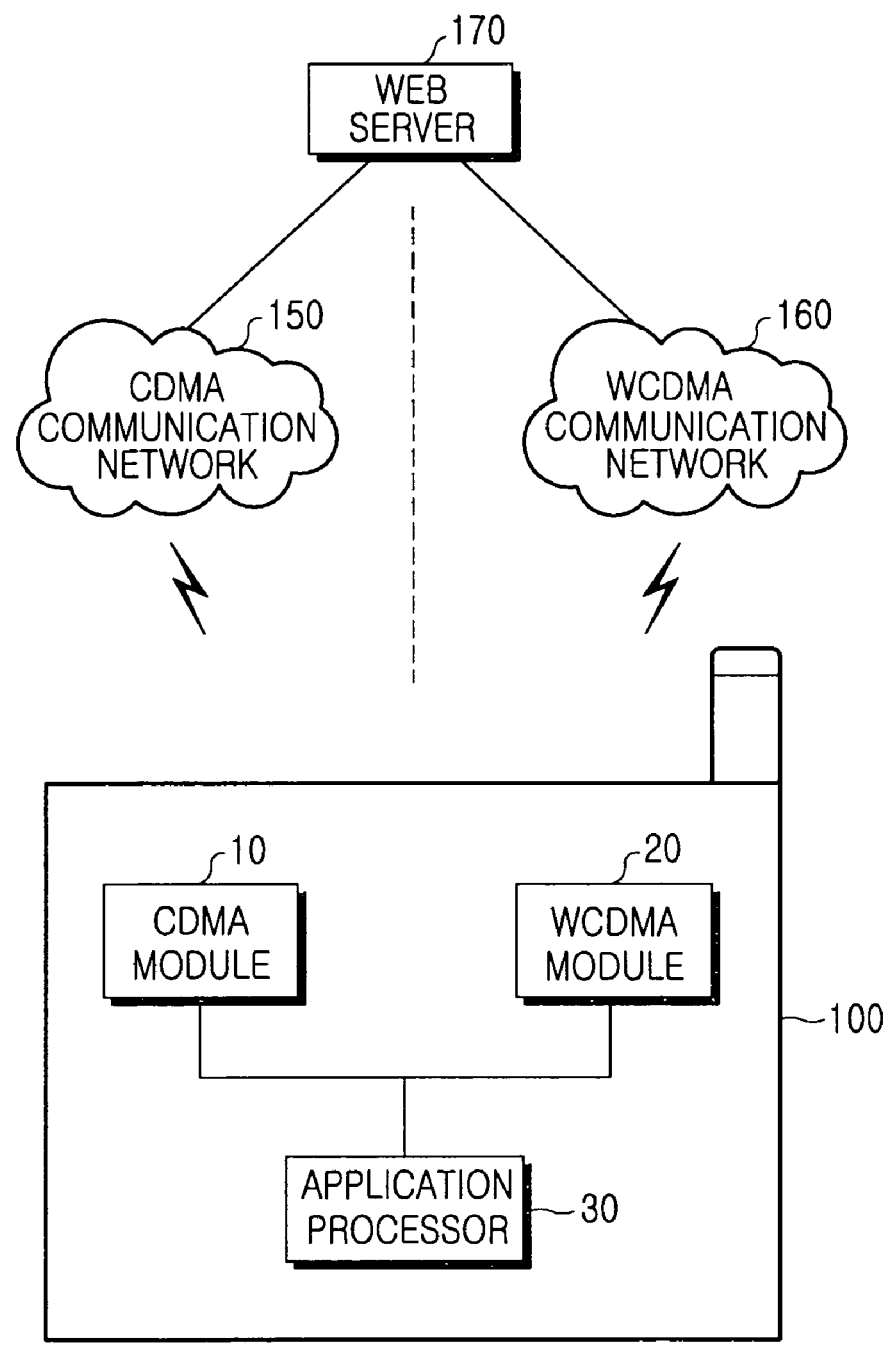
FIG. 2 is a block diagram illustrating a dual-mode mobile terminal according to a preferred embodiment of the present invention.

FIG. 2 is a block diagram illustrating a dual-mode mobile terminal according to a preferred embodiment of the present invention. Referring to FIG. 2, the dual-mode mobile terminal 100 includes a CDMA module 10, a WCDMA module 20, and an application processor 30. Each of the CDMA and WCDMA modules is provided with a modem (not shown) and a radio frequency portion (not shown). The mobile terminal 100 supporting the WCDMA and CDMA modes includes two modem chips that support different mobile communication services and correspond to the WCDMA and CDMA modes respectively. Here, each of the WCDMA and CDMA modules is connected with the application processor 30 through a hardware communication route.

Alternatively, the WCDMA and CDMA modules may be integrated in only one modem chip. Further, a software type of application processor may be contained in the modem chip. Two modem chips may be mounted in the mobile terminal 100 and contain the WCDMA and CDMA modules, respectively. A WCDMA or CDMA modem chip including a controller, and another modem chip having no controller may be mounted in the mobile terminal 100.

The CDMA module 10 is connected to a CDMA communication network 150, to provide a circuit service and a packet service to a user. Further, the WCDMA module 20 is connected to a WCDMA communication network 160, to provide a circuit service and a packet service to a user. When providing the packet service to the user, the CDMA and WCDMA modules 10 and 20 can be connected to a web server 170 through each of corresponding communication networks 150 and 160. For example, the CDMA and WCDMA modules 10 and 20 receive a service for a video on demand through the web server 170.

In an operation of the dual-mode mobile terminal for substantially securing the continuity of the PS call during a handover between the different mobile communication networks, the dual-mode mobile terminal 100 enters into a WCDMA communication network 160 in which the mobile terminal 100 can perform communication through the WCDMA module. Accordingly, it is assumed herein that the CDMA module 10 is in a disabled state. When the application processor 30 of the dual-mode mobile terminal receives a request for a packet communication service from the user or according to predetermined condition, the application processor 30 generates a PS call and requests a packet service through a WCDMA communication network to which the mobile terminal is currently connected. That is, the application processor 30 generates a PS call and transmits the PS call through a currently connected WCDMA communication network.

In response to the request for the PS call, the WCDMA module 20 initializes for the PS call with the WCDMA communication network 160, which in turn receives an IP address, port number, etc., from the WCDMA communication network 160. At the same time, the WCDMA module 20 commands the CDMA module 10 to enter into a low power mode. The CDMA module 10 is enabled with a response to the control of the WCDMA module, so as to enter into the low power mode.

Thereafter, the WCDMA module 20 determines if an event for a handover occurs. When the event for handover occurs, the WCDMA module 20 informs the WCDMA communication network 160 of the occurrence of the event for handover. When receiving a message for the handover from the WCDMA communication network 160, the WCDMA module enables the CDMA module 10 to perform an initialization for the PS call.

Herein, the event for the handover may be an occurrence of any proper condition for the handover of a PS call in the dual-mode mobile terminal. Accordingly, the time points for awaking the communication module in the lower power mode included in the following two cases, with which the present invention will be described, is not limited thereto.

For example, when the dual-mode mobile terminal 100 moves from a boundary of a coverage area of the WCDMA communication network 160 to a coverage area (sometimes, referred to as a border cell) of the CDMA communication network 150, the WCDMA module 20 reports an entry into a new communication network to the WCDMA communication network 160. When an intensity of signals from the currently connected WCDMA communication network 160 is weaker than that of signals from another communication network, an entry into the new communication network may be determined.

When the WCDMA communication network 160 receives the notification of the entry into the new communication network from the dual-mode mobile terminal 100, the WCDMA communication network 160 recognizes communication with the dual-mode mobile terminal 100 for the packet service and sends a handover message to the dual-mode mobile terminal.

Alternatively, when the dual-mode mobile terminal 100 receives the optimal packet service data from the WCDMA communication network 160 during the packet service communication with the WCDMA communication network 160, the mobile terminal 100 reports the reception of the packet service data to the WCDMA communication network 160. The WCDMA communication network 160 recognizes the packet service communication with the dual-mode mobile terminal 100 and sends a handover message to the dual-mode mobile terminal. In this case, at a point of time of receiving the optimal signals from the communication network with which the mobile terminal is currently connected, the mobile terminal performs the handover to another other communication network, in order to continue a communication for the PS call.

When the WCDMA module 20 receives the handover message, the WCDMA module 20 operates the CDMA module 10, which maintains the low power mode. The CDMA module 10 performs an initialization for the PS call with the CDMA communication network 150 and receives information of IP address, port number, etc., from the CDMA communication network 150, which in turn stores the information in a TCP/IP layer or a socket layer.

More specifically, according to a preferred embodiment of the present invention, when the dual-mode mobile terminal is connected with the CDMA communication network to receive the CDMA call in the status of connection with the WCDMA communication network and a reception of the WCDMA call, and has the IP address and the port number assigned thereto, the mobile terminal does not transmit the information identifying the IP address and the port number to the application processor, and stores the information in the TCP/IP layer or the socket layer.

When the initialization is completed, the CDMA module 10 reports the completion to the WCDMA module 150. The WCDMA module 150 receives the report of the completion from the CDMA module 10, and instructs the application processor 30 to perform the handover. The application processor 30, which receives the instruction about the performance of the handover, interrupts the reception of the packet service data through the WCDMA module 20 and receives packet service data through the CDMA module 10.

However, after the CDMA module 10 reports the completion of the initialization to the WCDMA module 20, and the CDMA module 10 transfers the IP address and the port number, which are assigned to the CDMA communication network 150 and stored in the TCP/IP layer or the socket layer, to the application processor 30. Therefore, the application processor 30 already has information about the IP address in order to perform the packet service communication through the CDMA communication network at the time point at which the WCDMA module 150 instructs the application processor 30 to perform the handover. Accordingly, the application processor 30 can minimize the time necessary for the handover of the PS call, and immediately open a socket.

That is, the application processor 30 closes a socket for the WCDMA module 20 and opens a socket for the CDMA module 10, in order to receive the information identifying the IP address, the port number, etc. Thereafter, the application processor 30 receives the packet service data through the CDMA module 10 using information such as IP address, port number, etc., received from the CDMA module 10.

After instructing the application processor 30 to perform the handover, the WCDMA module 150 interrupts the packet service communication with the WCDMA communication network 20 and enters into a low power mode.

As described above, when the CDMA module 10 sends the WCDMA module 20 signals of the completion of a connection with the CDMA communication network for the PS call, the WCDMA module 20 informs the application module 30 of the performance of an inter-RAT handover and interrupts the communication with the WCDMA communication network for the packet service call. Thereafter, the WCDMA module 20 enters into the low power mode.

It will be obvious to those skilled in the art that the WCDMA module 20 entering into the low power mode is able to operate similarly to the CDMA module, which also enters into the low power mode, and the CDMA module 10 performing the packet service communication is able to operate similarly to the WCDMA module 20 which also performs the packet service communication, as described above.

While the present invention has been described to include the CDMA module 10, the WCDMA module 20, and the application processor 30, it will be understood by those skilled in the art that the application processor 30 can be embodied in the CDMA module 10 or the WCDMA module 20.

Figure 3:
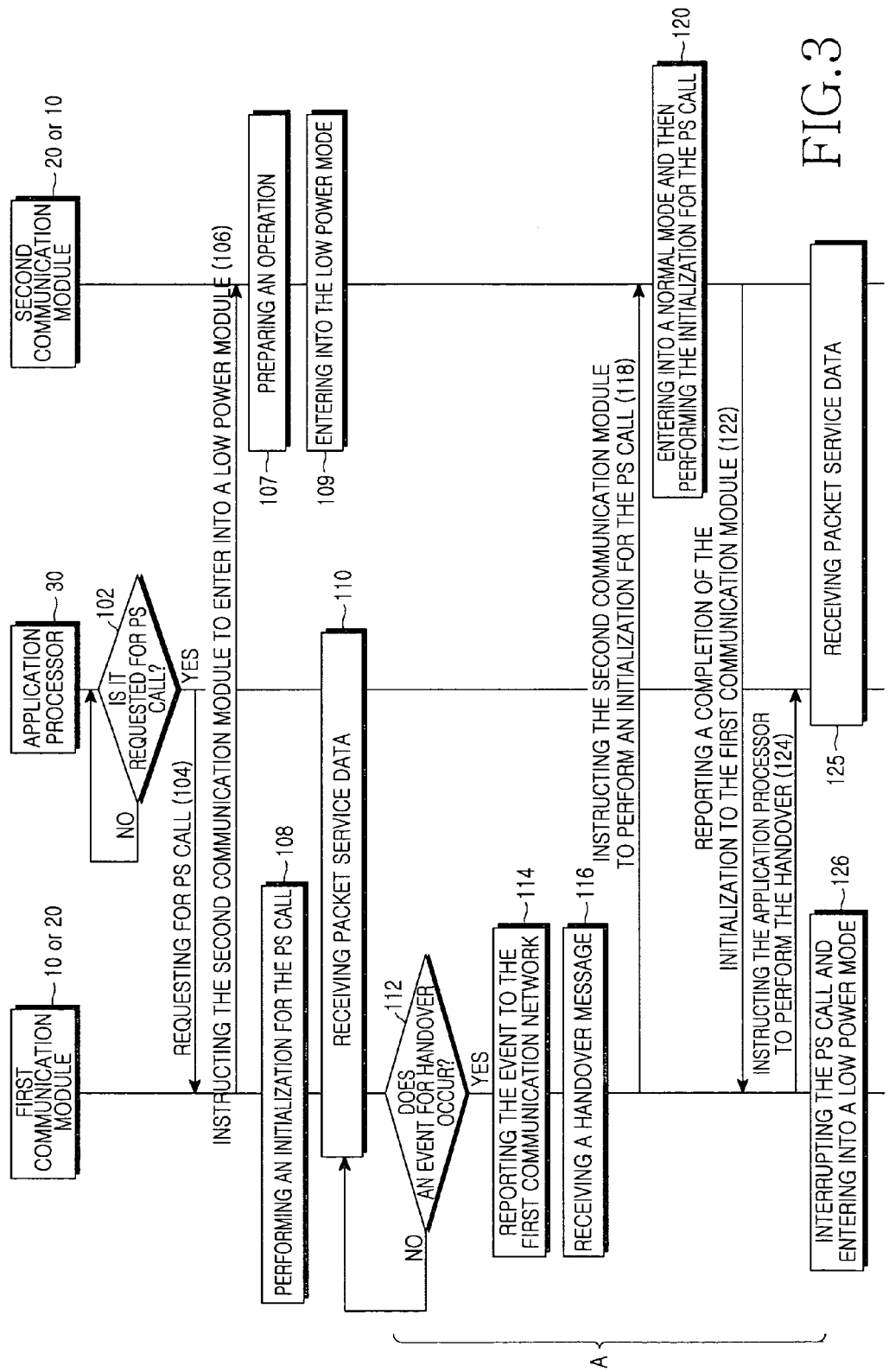
FIG. 3 is a block diagram illustrating a handover in the dual-mode mobile terminal according to the present invention, which illustrates a flow of messages between the first and second communication modules.

FIG. 3 is a block diagram illustrating a handover of the dual-mode mobile terminal according to the present invention, which illustrates a flow of messages between first and second communication modules. Hereinafter, the WCDMA communication network and the CDMA communication network will be referred to as the communication networks. A communication network with which the dual-mode mobile terminal communicates for a packet service communication will be referred to as a first communication network, while the other communication network with which the dual-mode mobile terminal communicates in order to perform a handover for a packet service communication will be referred to as a second communication network. Further, a module capable of communicating with the first communication network will be referred to as a first communication module, and the other module communicating with the second communication network will be referred to as a second communication mode.

Additionally, although the WCDMA and CDMA communication networks are illustrated in this embodiment of present invention, it will be understood by those skilled in the art that the present invention can be applied to a variety of different communication networks.

Referring to FIG. 3, in Step 102, the application processor 30 determines if it is requested for a PS call by a user or according to some certain condition. When the PS call is requested, the application processor 30 requests the PS call from the first communication module, which could be either the CDMA module 10 or the WCDMA module 20, in Step 104. The first communication module 10 or 20 responds to the request for the PS call and instructs the second communication module, which could be either the WCDMA module 20 or the CDMA module 10, respectively, 20 or 10 to enter into a low power mode in Step 106. The first communication module 10 or 20 performs an initialization for communication with the first communication network for the PS call and receives an IP address, a port number, etc., for the PS call from the first communication network in Step 108. The first communication module 10 or 20 receives packet service data from the first communication network according to the request for the PS call and transfers them to the application processor 30 in Step 110.

However, when receiving the instruction of entering into the low power mode from the first communication module 10 or 20, the second communication module 20 or 10 prepares for an operation in Step 107 and enters into the low power mode in Step 109.

The first communication module 10 or 20 detects if an event for an handover occurs during the packet service communication in Step 112. If the event for the handover occurs, the first communication module 10 or 20 informs the first communication network of it in Step 114.

Thereafter, while receiving a handover message from the first communication network in Step 116, the first communication module 10 or 20 instructs the second communication module 20 or 10 to initialize for the PS call in Step 118. The second module 20 or 10 responds to the instruction and changes its status from the low power mode into a normal mode in Step 120, which in turn performs an initialization for the PS call. The second communication module 20 or 10 receives the information of the IP address, the port number, etc., and stores them in the TCP/IP layer or the socket layer.

After completing the initialization for the PS call, the second communication module 20 or 10 informs the first communication module 10 or 20 of the completion of the initialization, in Step 122. The first communication module 10 or 20 responds to the completion of the initialization of the second communication module and instructs the application processor 30 to perform the handover in Step 124.

Thereafter, the application processor 30 interrupts the reception of the packet service data through the first communication module 10 or 20 and receives the packet service data through the second communication module 20 or 10. In this case, the second communication module 20 or 10 transfers the IP address and the port number, which has been stored in the TCP/IP layer or the socket layer, to the application processor 30.

The first communication module 10 or 20 instructs the application processor 30 to perform the handover. The first communication module 10 or 20 interrupts the packet service communication through the first communication network, which in turn enters into the low power mode in Step 126.

However, the first communication module staying in the low power mode and the second communication module performing the packet service communication respectively may perform the steps indicated by a letter A in FIG. 3.

Figure 4:
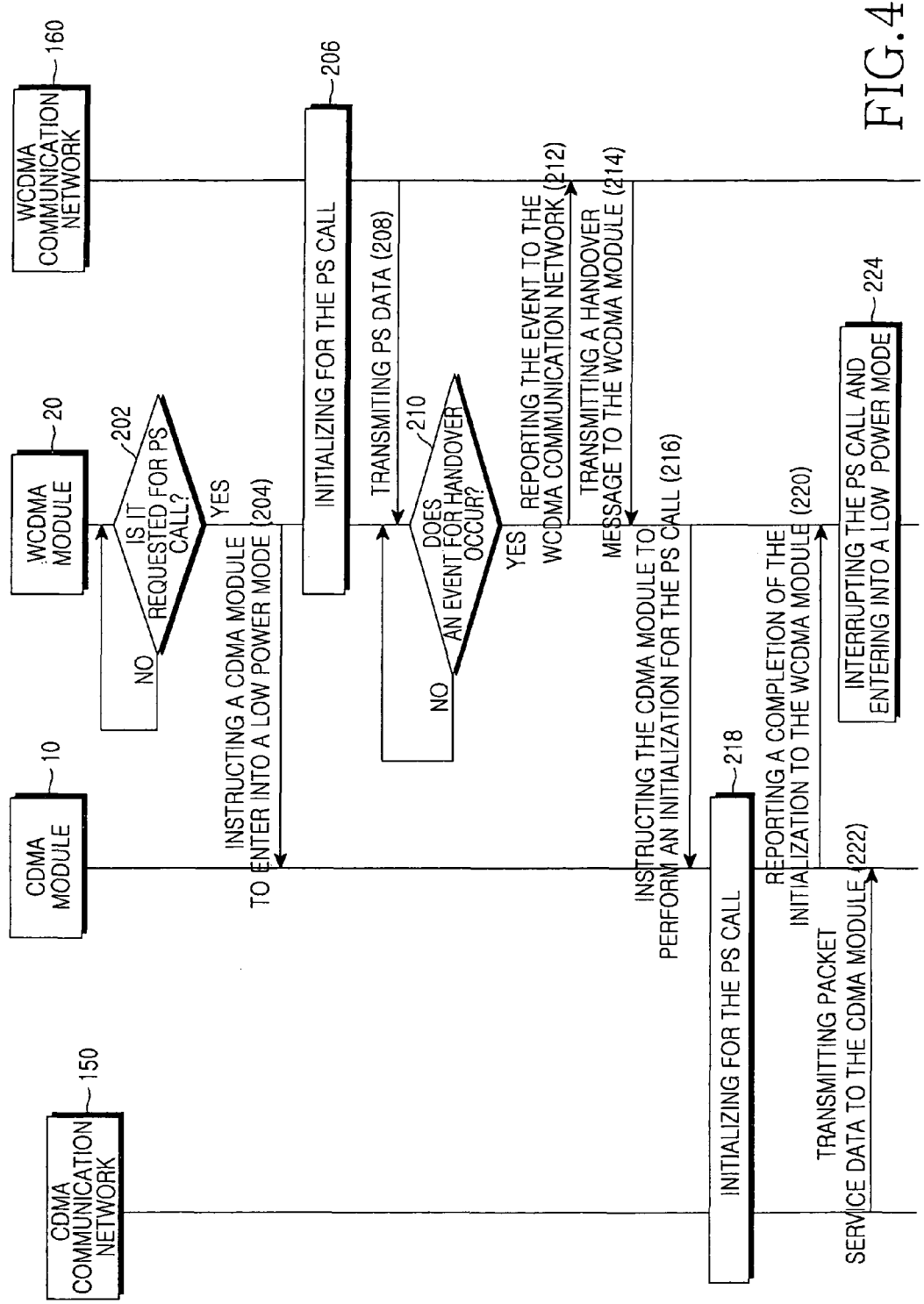
FIG. 4 is a block diagram illustrating a handover between the dual-mode mobile terminal and communication networks according to the present invention, which illustrates a flow of messages between the mobile terminal and the communication networks.

FIG. 4 is a block diagram illustrating a handover between the dual-mode mobile terminal and communication networks according to the present invention, which illustrates a flow of messages between the mobile terminal and the communication networks. Referring to FIG. 4, the WCDMA module 20 determines if it is requested for a PS call in Step 202. When it is requested for the PS call, the WCDMA module 20 instructs the CDMA module 10 to enter into a low power mode, so that the CDMA module 10 prepares for its operation and enters into the low power mode, in Step 204. The WCDMA module 20 performs an initialization for the PS call between the WCDMA communication network 160 and the WCDMA module 20 according to a request for the PS call in Step 206.

Therefore, the WCDMA communication network 160 transmits packet service data, which correspond to the PS call requested by the WCDMA module 20, to the WCDMA module 20 in Step 208.

The WCDMA module 20 detects if the mobile terminal is moves to anther communication network area in Step 110. Of course, it is obvious by those skilled in the art that the present invention is not limited to the detection of the movement of the mobile terminal, but rather that and any event for the handover may be detected.

When the WCDMA module 20 detects that the mobile terminal moves to another communication network area, the WCDMA module 20 informs the WCDMA communication network 160 of a corresponding event in Step 212. The WCDMA communication network 160 transmits a handover message to the WCDMA module 20 with a response to the information, in Step 214.

When receiving the handover message from the WCDMA communication network 160, the WCDMA module 20 commands the CDMA module 10 to perform an initialization for the PS call, in Step 216. The CDMA module 10 performs an initialization for a PS call to the CDMA communication network. The CDMA module 10 receives an IP address, a port number, etc., for the PS call from the CDMA communication network 150, as described above. Therefore, the CDMA communication network 150 transmits packet service data to the CDMA module 10 in Step 222.

However, after completing the initialization for the PS call, the CDMA module 10 informs the WCDMA module 20 of the completion of the initialization in Step 220. Thus, the WCDMA module 20 interrupts the PS call and enters into the low power mode.

According to the present invention, as described above, when a dual-mode mobile terminal moves to a new communication network while communicating with an existing communication network, a duration of the handover for the PS call can be minimized and a continuity of the PS call can be secured.

While the present invention has been shown and described with reference to certain preferred embodiments thereof, it will be understood by those skilled in the art that various changes in form and detail may be made therein without departing from the spirit and scope of the invention as defined by the appended claims.

What is claimed is:

1. A dual-mode mobile terminal for performing a handover for a packet service call between first and second communication networks, the dual-mode mobile terminal comprising:
   a first communication module for receiving packet service data through the first communication network, the first communication module being connected to and capable of communicating with the first communication network; and
   a second communication module for communicating with the second communication network and being in a disabled state,
   wherein the first communication module commands the second communication module to prepare for operation and enter into a low power mode, when a packet service call is requested, and commands the second communication module to initialize for a packet service communication, after receiving a handover message from the first communication network when an event for the handover occurs.

2. The dual-mode mobile terminal as claimed in claim 1, further comprising an application processor for requesting the packet service call of the first communication module.

3. The dual-mode mobile terminal as claimed in claim 1, wherein the event for the handover is one of an entry into the second communication network and a reception of an optimal signal from the first communication network.

4. The dual-mode mobile terminal as claimed in claim 2, wherein the second communication module informs the first communication module of completion of the initialization, after completing the initialization, and
wherein the first communication module commands the application processor to perform the handover in order for the application processor to receive packet service data through the second communication module, after receiving the information of the initialization from the second communication module.

5. The dual-mode mobile terminal as claimed in claim 1, wherein the second communication module receives packet service data corresponding to the packet service call through the second communication network, after initialization for the packet service communication.

6. The dual-mode mobile terminal as claimed in claim 1, wherein the second communication module informs the first communication module of a completion of the initialization after completing the initialization of the second communication module, and
wherein the first communication module interrupts the packet service communication with the first communication network and enters into a low power mode, after receiving the information of the initialization of the second communication module.

7. The dual-mode mobile terminal as claimed in claim 1, wherein the second communication module stores an IP address and a port number assigned to the second communication module during the initialization.

8. A method of performing a handover of a packet service call between first and second communication networks using a dual-mode mobile terminal including a first communication module for communicating with a first communication network and a second communication module for communicating with a second communication network, the method comprising the steps of:

receiving packet service data through the first communication network in the first communication module;
commanding, by the first communication module, the second communication module to prepare for an operation and to enter into a low power mode;
receiving in the first communication module a handover message from the first communication network, after an event for the handover occurs; and
commanding, by the first communication module, the second communication module to initialize for a packet service communication.

9. The method as claimed in claim 8, wherein the event for the handover is one of an entry into the second communication network and a reception of an optimal signal from the first communication network.

10. The method as claimed in claim 8, further comprising the steps of
performing an initialization for the packet service communication in the second communication module; and
receiving packet service data corresponding to the packet service call through the second communication network.

11. The method as claimed in claim 8, further comprising the steps of:
informing the first communication module of a completion of the initialization, after the second communication module completes the initialization;
interrupting the packet service communication with the first communication network by the first communication module; and
switching the first communication module into a low power mode.

12. The method as claimed in claim 8, further comprising the steps of:
assigning an IP address and a port number to the second communication module, after the second communication module performs the initialization for the packet service communication; and
storing the assigned IP address and the assigned port number.

* * * * *